July 10, 1934.  C. G. STEFFEN  1,966,268
MACHINE FOR APPLYING OR SPREADING NUT MEATS TO BAKERY PRODUCTS
Filed Dec. 31, 1931
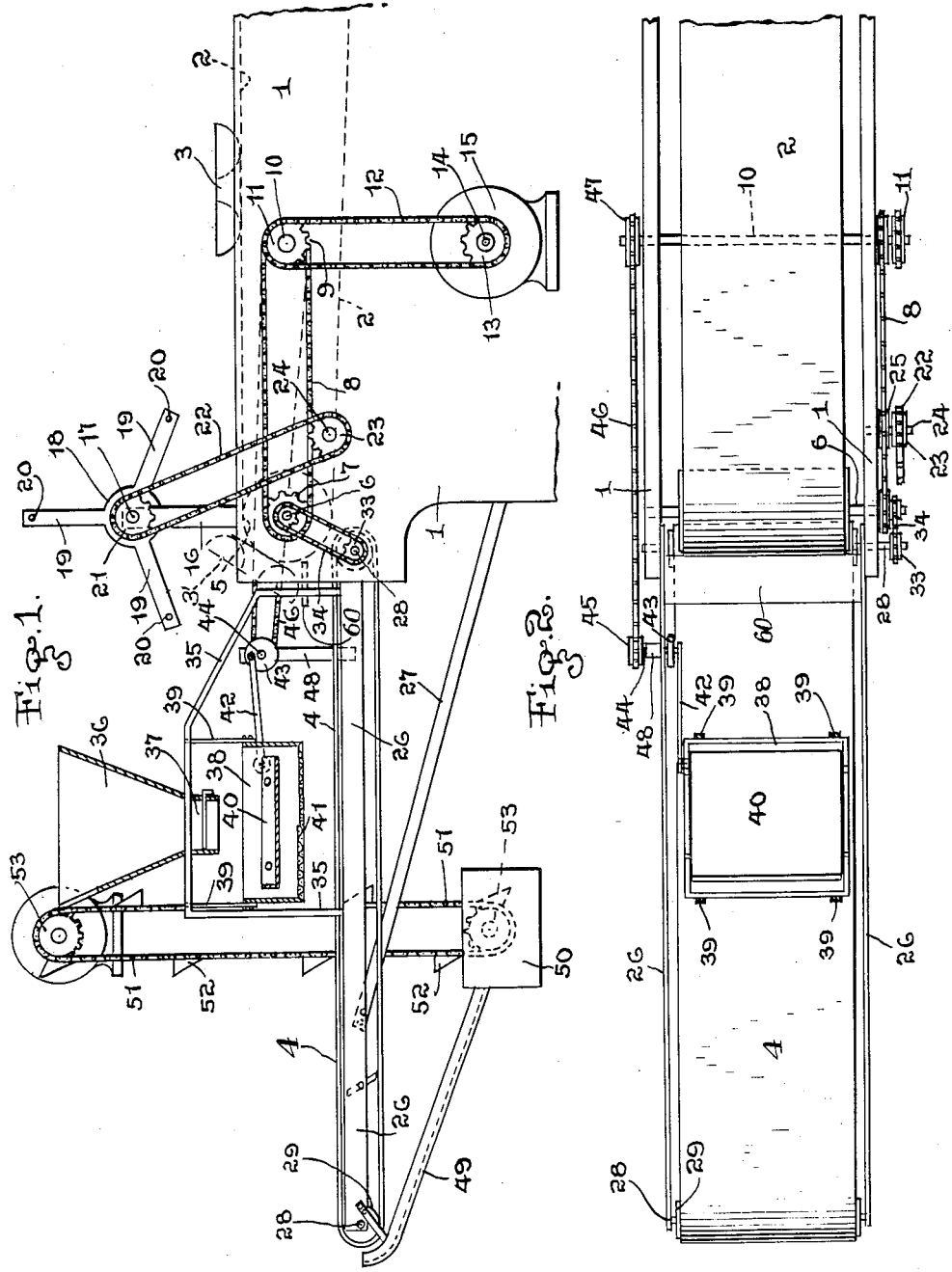
INVENTOR
Charles G. Steffen
BY his ATTORNEY Patented July 10, 1934

1,966,268

UNITED STATES PATENT OFFICE 1,966,268

MACHINE FOR APPLYING OR SPREADING NUT MEATS TO BAKERY PRODUCTS

Charles G. Steffen, South Jamaica, N. Y., assignor to New York Dugan Brothers, Inc., Brooklyn, N. Y., a corporation of New York Application December 31, 1931, Serial No. 584,091

6 Claims. (Cl. 107—1)

The invention relates to an improved means of applying or spreading nut meats or other comminuted material to coffee-rings, pastry and other forms of bakers' confections and has particular reference to apparatus comprising suitable mechanism associated with structure for applying frosting and sugar coatings to such articles as referred to and of conveying same without manual aid to a secondary conveyor means forming part of an automatic means for sprinkling and spreading sized nut meats upon the frosted or sugar coated surfaces of such confections, eliminating any possible manual handling and reducing to a minimum the present day method of adding nut meats to such articles of the bakers' handicraft.

The object of the invention resides particularly in the provision of mechanism adapted to receive cakes, pastry and specifically coffee-rings from a sugar coating means; consisting of means adapted to remove such cakes from the frosting conveyor and of disposing same into proper position upon an auxiliary conveyor means upon which said cakes are carried to a point wherein an automatic nut-meat spreader or sprinkler applies said meats to the freshly frosted cake surfaces during its passage upon said conveyor, all excessive nut-meats dropping upon said conveying means being carried to a chute, whence they pass to a point of reclamation, the latter mechanism having associated therewith a conveyor means adapted to return the reclaimed nut meats to the supply source and re-passed through the spreading or sprinkling member until entirely consumed thusly providing a new, quiet, sanitary and economic means of mechanically adding nut-meats to cakes and like forms of bakery products and confections.

In the following there is described the general embodiment of the invention the features thereof being more clearly defined hereinafter in the claims.

In the drawing forming part hereof Fig. 1 is a longitudinal elevation, parts being shown in similar sectional form of the attachment constituting the nut-meat spreading and sprinkling means of the invention, and Fig. 2 is a plan elevation of the nut-meat spreader mechanism forming an associate part of the conveying mechanism of the structure for carrying the frosted coffee-rings and sugar coated cakes to such added structure.

Similar numerals of reference indicate similar and like parts throughout the views forming the drawing illustrating the invention herein.

In the drawing 1 represents the end section of a mechanism adapted to apply a coating of sugar, frosting, or the like, to cakes, coffee rings or the like, the details of which are not shown, and which is herein referred to as the frosting applying means.

An endless conveyor 2 carries the treated cakes or coffee rings 3 from such coating or frosting applying means to the mechanism herein more particularly described.

The frosting applying means which I preferably employ in connection with my improved device, is adapted to apply the coating or frosting to the underside of the cakes or coffee rings and, as the nut meats or other material is applied to the coated side, it is desirable to invert or turn over the cakes or coffee rings before the comminuted material is applied.

For this purpose, I provide at the discharge end of the conveyor 2 a pair of uprights 16 carrying a rotatable shaft laterally disposed with reference to the conveyor, on which shaft 17 is mounted a drum 18 carrying a plurality of spaced arms 19 between each pair of which arms 19 is provided, adjacent their ends, a cross arm or wire 20. The coffee rings are carried by the conveyor 2 to its discharge or delivery end where each said coffee ring rides over the end of the conveyor and falls upon the platform 60 and rests thereon in an inclined position, as illustrated in dotted lines in Figure 1, in which the coffee ring in its inclined position is indicated by $3^1$.

The cross arms or wires 20 rotate in a clockwise direction and the rotation thereof is so synchronized with the movement of the conveyor, by the connecting drive means, that the upper edge portion of the coffee ring, in its inclined position as it rests upon the platform 60, is engaged by one of the rotating cross arms or wires 20, and the coffee ring is thereby turned over or inverted and falls in an inverted position upon the auxiliary conveyor 4.

The conveyor 2 is mounted on a drum 5, the shaft 6 of which carries a sprocket 7 and chain 8 engaging a similar sprocket 9 on the shaft 10 and a like sprocket 11 actuated by means of a chain 12 driven from the sprocket 13 on the rotor shaft 14 of the motor 15, whence all of the power is derived. On the shaft 17 is provided a sprocket 21 carrying a chain 22 which latter engages the sprocket 23 on the shaft 24, said shaft 24 having also mounted thereon a sprocket wheel 25 riding in the links of chain 8 of the actuating mechanism, in order to impart to the rotating arms 19 motion synchronized with the travel of the conveyor 2, for turning over the frosted articles from conveyor 2 and the platform 60 to the conveyor 4 as above described. 26 indicates an auxiliary supporting frame, which is reinforced by struts 27, and which has mounted thereon at its respective ends, shafts 28 carrying drums 29 supporting the conveyor belt 4, the inner shaft 28 carrying a sprocket 33 and chain 34 engaging a sprocket wheel on the shaft 6 of the general power transmission source.

The frame 26 supports an auxiliary frame 35 having mounted thereon a supply hopper 36 having a feed bottom 37 disposed above a shaker mechanism comprising a receptacle 38 suspended on spring straps 39 attached to said frame 35, said receptacle 38 having disposed therein a shaker pan 40, said receptacle 38 and pan 40 being arranged for a shaking action by reason of the spring suspension of its supporting straps 39.

The shaking function causes the nut meats to fall from the pan 40 to the screen bottom 41 of the receptacle 38 from which they are delivered to and fall upon the freshly frosted cake or coffee ring 3 passing thereunder on the continuous conveyor 4. The receptacle 38 and its parts are shaken or vibrated by reason of the rocker arm 42 one end of which is secured thereto and the other end is pinioned on a cam 43 on the shaft 44, the actuation of which is through the sprocket 45 and chain 46 which are driven by the sprocket 47 on the shaft 10 of the power transmission source. The shaft 44 of the cam 43 being supported by the standard 48 attached to the frame 26.

The nut meats as they are shaken upon the frosted articles fall upon the conveyor apron 4, which collects such parts of the said nut meats as do not adhere to the cakes, and such surplus nut meats are conveyed thereby to the end of the conveyor where they are discharged and fall therefrom into the chute 49 which leads to the container 50 from which such surplus nut meats are carried by a vertically disposed conveyor 51 provided with pockets 52 which recover the reclaimed nut meats and return them to the hopper 36 of the nut meat supply, returning all unused material to its original source whence it may be again applied to the cakes, coffee rings or other articles as above explained.

The conveyor 51 is operative on the drum 53 and may be driven through suitable chain and sprocket transmissions actuated from the original power source as described, or from an independent motor source as desired. The operation of the structure is clearly defined in the description as outlined, and the invention involved may therefore be widely varied without departing from the spirit thereof.

What I claim and desire to secure by Letters Patent of the United States is:

1. In a device of the character described, the combination of a conveyor having a delivery end, an auxiliary conveyor adjacent the said delivery end of the first named conveyor and positioned below the horizontal plane thereof, a platform intermediate the said conveyors and adapted to receive articles from the delivery end of the first named conveyor, a movable arm adjacent the delivery end of the first named conveyor and adapted to contact with articles on said platform and to invert the said articles and cause them to fall in inverted position on the said auxiliary conveyor.

2. In a device of the character described, the combination of a conveyor having a delivery end, a platform adjacent the said delivery end of the conveyor and so positioned and spaced below the horizontal plane thereof, that cakes delivered from the conveyor to the platform and resting on their edges will have a marginal portion lying above the horizontal plane of the conveyor, an arm adjacent the said platform and positioned to contact with said marginal portion of the said cakes resting on said platform and invert the said cakes.

3. In a device of the character described, the combination of a conveyor having a delivery end, a platform adjacent the said delivery end and so positioned and spaced below the horizontal plane thereof that cakes delivered from the conveyor to the platform and resting on their edges will have a marginal portion lying above the horizontal plane of the conveyor, a plurality of rotatable arms adjacent the said platform and positioned to contact with said marginal portion of the said cakes resting on the platform and invert the same.

4. In a device of the character described, the combination of a conveyor having a delivery end, a platform adjacent the said delivery end and so positioned and spaced below the horizontal plane thereof that cakes delivered from the conveyor to the platform and resting on their edges will have a marginal portion lying above the horizontal plane of the conveyor, an auxiliary conveyor adjacent said platform and positioned to receive from said platform cakes delivered thereto from said first named conveyor, means for contacting with said marginal portion of said cakes to invert the same to said auxiliary conveyor, means adjacent said auxiliary conveyor for supplying nut meats to said articles thereon and means for vibrating said nut meat delivery means, said vibrating means comprising a cam, a shaft mounted eccentrically on the said cam and drive means therefor.

5. In a device of the character described the combination of a conveyor having a delivery end, a platform adjacent the said delivery end and positioned below the horizontal plane thereof, an auxiliary conveyor adjacent said platform and positioned below the horizontal plane thereof, and means for causing articles carried on said first named conveyor to fall therefrom to said platform and thence to said auxiliary conveyor in inverted position, a shaking device positioned above the said auxiliary conveyor and a common source of power supply operatively connected with the said shaking device and with the said conveyors.

6. A device for applying nut meats and the like to the frosted side of cakes having one frosted side which comprises a conveying member which receives cakes with the frosted side down, a rest at the delivery end of the said conveying member and spaced below the horizontal plane thereof, which receives said cakes from said conveying member, and upon which the said cakes rest with a marginal portion above the horizontal plane of the said conveyor, means adjacent said rest which contact with said marginal portion of said cakes when the same are on the said rest and throw the said cakes from said rest, and a second conveyor which receives the said cakes from the said rest with their frosted side uppermost, and means for applying nut meats to said frosted side of the said cakes on the said second conveyor.

CHARLES G. STEFFEN.